3,320,307
PROCESS FOR THE PRODUCTION OF POTASSIUM SORBATE
Frank Ernest Kerr, Hull, England, assignor to The Distillers Company Limited, Edinburgh, Scotland, a British company
No Drawing. Filed May 23, 1963, Ser. No. 282,570
Claims priority, application Great Britain, June 20, 1962, 23,651/62
6 Claims. (Cl. 260—526)

The present invention relates to the production of alkali metal salts of sorbic acid.

Alkali metal salts of sorbic acid may be produced by neutralising sorbic acid with the appropriate alkali metal hydroxide or carbonate in aqueous solution, but salts prepared in this way may be unacceptable as to color or purity, since impurities tend to accumulate in the salt on crystallisation.

According to the present invention the process for the production of an alkali metal sorbate comprises reacting a solution of sorbic acid in acetone with an alkali metal carbonate.

The reaction of the present invention is preferably carried out using an excess of sorbic acid over the alkali metal carbonate, for example about 5% excess on a molar basis. The concentration of sorbic acid in solution in the acetone is not critical, but approximately 10% sorbic acid by weight based on the total weight of sorbic acid and acetone is suitable. High concentrations of sorbic acid can lead to excessively viscous mixtures in the reactor. The sorbic acid used in the reaction need not be subjected to stringent purification processes, since the impurities resulting from its synthesis from ketene and crotonaldehyde remain in the acetone solution on crystallisation, and do not contaminate the salts produced.

The alkali metal carbonate may be added to the solution of sorbic acid in acetone in a substantially anhydrous state but it is preferred to add the alkali metal carbonate as an aqueous solution; it is particularly preferred to employ a saturated aqueous solution of alkali metal carbonate. Preferably the alkali metal carbonate is potassium carbonate.

In one method of carrying out the present invention, a solution of sorbic acid in acetone is prepared, and the alkali metal carbonate is added while stirring. When an amount of the carbonate has been added which is slightly less than that required fully to neutralise the sorbic acid, the mixture is raised to reflux temperature and maintained at this temperature until reaction is complete; during the whole of the heating period the mixture is stirred to avoid segregation of the alkali metal carbonate. The resulting mixture is cooled and the separated salt is removed, for example by filtration or decantation. It is preferred to increase the acetone concentration after reaction, when an aqueous solution of alkali metal carbonate is used.

The process of the invention is illustrated by the following examples.

EXAMPLE 1

28 g. of crude sorbic acid prepared by the acid cleavage of the condensation product of ketene and crotonaldehyde was dissolved in 237 g. acetone (containing 0.4% w./v. of water) in a stirred flask and 13.8 g. finely powdered anhydrous potassium carbonate was added. The mixture was raised to reflux temperature and held there with stirring over 1½ hours (until the evolution of carbon dioxide had ceased).

The mixture was cooled with stirring, filtered and the potassium sorbate washed with 79 g. acetone and dried at room temperature. The mother liquor and washings were made up to 237 g. and recycled for the next preparations.

There was no fall in quality of potassium sorbate produced from the recycled solvent, and the yield fell only slightly. The yield of potassium sorbate based on the potassium carbonate added was 93–99%, and the product was over 96% pure.

EXAMPLE 2

Sorbic acid (64 lbs.) was dissolved in acetone (400 lbs.) at 45° C. To the stirred solution was added 50% w./w. aqueous potassium carbonate solution in an amount equivalent to 37.2 lbs. of pure potassium carbonate. The solution was stirred at reflux temperature for two hours. At the end of this period, a further 400 lbs. of acetone was added, and the solution was cooled and centrifuged. The solid was washed with a small amount of acetone and dried in a vacuum oven. The yield was 85% and the material was more than 99% pure.

I claim:

1. A process for the production of potassium sorbate which comprises adding potassium carbonate to a solution of sorbic acid in a solvent consisting essentially of acetone, heating the mixture to reflux temperature and recovering potassium sorbate from the reaction mixture.

2. The process as claimed in claim 1 in which more than one mole of sorbic acid is reacted per mole of potassium carbonate.

3. The process as claimed in claim 1 in which the solution of sorbic acid in acetone contains about 10% of sorbic acid by weight.

4. The process as claimed in claim 1 in which the potassium carbonate is added to the solution of sorbic acid in acetone as an aqueous solution.

5. The process as claimed in claim 4 in which the aqueous solution of the potassium carbonate is a saturated aqueous solution.

6. The process as claimed in claim 4 in which a further quantity of acetone is added to the mixture after the reaction is complete.

References Cited by the Examiner
UNITED STATES PATENTS
2,866,819   12/1958   Montagna et al. _____ 260—526

FOREIGN PATENTS
1,045,390   12/1958   Germany.
1,220,592   1/1960   France.

LORRAINE A. WEINBERGER, Primary Examiner.
H. G. MOORE, LEON ZITVER, Examiners.
IRVING R. PELLMAN, MARY B. WEBSTER,
Assistant Examiners.